UNITED STATES PATENT OFFICE.

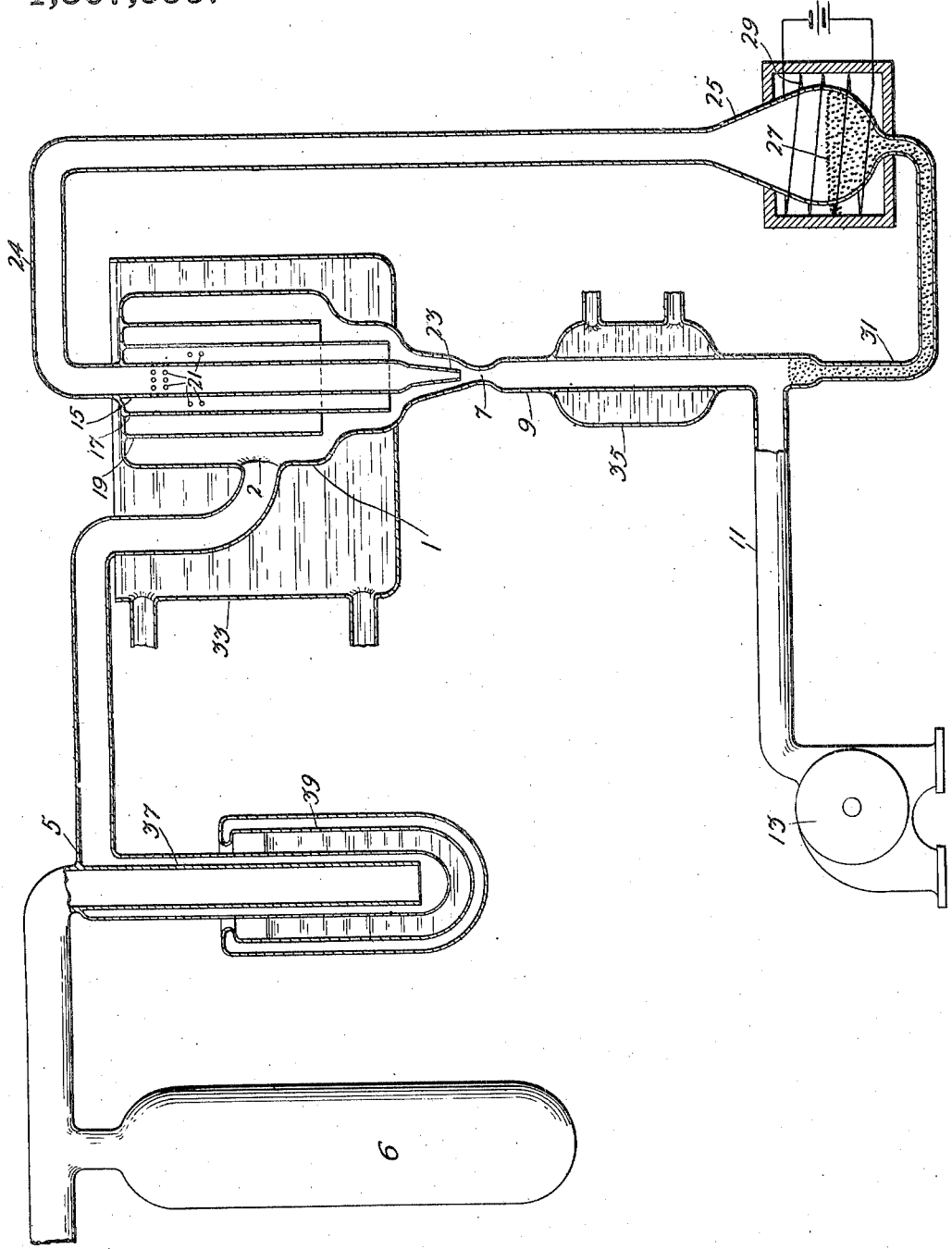

OLIVER E. BUCKLEY, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD OF AND APPARATUS FOR EXHAUSTING TO LOW PRESSURES.

1,307,999.          Specification of Letters Patent.     Patented June 24, 1919.

Application filed March 30, 1918. Serial No. 225,849.

*To all whom it may concern:*

Be it known that I, OLIVER E. BUCKLEY, a citizen of the United States, residing at East Orange, in the county of Essex, State of New Jersey, have invented certain new and useful Improvements in Methods of and Apparatus for Exhausting to Low Pressures, of which the following is a full, clear, concise, and exact description.

The use of a stream of vapor as a means for drawing gas from an inclosed space is well known. It has, however, been found that when the pressure of the gas has fallen to a point that is yet considerably above the degree of vacuum required for many purposes the vapor molecules of an ordinary vapor stream tend to diverge from the vapor stream and to diffuse toward the vessel to be exhausted and thus to prevent a further reduction of the gas pressure.

It is the object of this invention to reduce the counter-pressure due to the vapor molecules and to maintain a sufficient forward flow of vapor to insure an economical speed of operation. To attain this object there are provided a plurality of vapor streams into which the gas to be exhausted is successively drawn, the streams being so arranged that the diffusion of molecules outward therefrom is substantially prevented. Other objects and advantages of the invention will appear from the following description taken in connection with the accompanying drawing, in which the single figure represents a cross section of a preferred arrangement.

The chamber 1 is connected through the lateral inlet 2 and a conduit 5, with the vessel 6 to be exhausted; through the opening 7 the chamber discharges into the conduit 9 opening into the conduit 11 leading to the fore or roughing pump 13. Extending through the chamber 1 in alinement with the discharge opening 7 and conduit 9 is the vapor conduit 15; surrounding vapor conduit 15 and substantially coaxial therewith are conduits 17 and 19. Small openings 21 in the walls of the conduits 15 and 17 provide means of restricted communication between the central passage within the conduit 15 and the surrounding passages between the walls of the conduits 15, 17 and 19. The conduit 17 extends beyond the conduit 19, and the conduit 15 extends beyond the conduit 17 and has its end contracted and formed into a nozzle 23 extending to within a short distance of the discharge opening 7. The end wall of the chamber 1 is gradually contracted toward the discharge opening to conform to the conical arrangement of the ends of the conduits, but is spaced from the ends of these conduits to provide a mixing chamber into which the discharge ends of the passages open, the mixing chamber being connected, through the outlet 2 and the conduit 5, with the vessel to be exhausted. The conduit 9 is preferably somewhat larger in diameter than the narrowest portion of the contracted end of the chamber 1 to reduce the back pressure in said conduit. The upper end of the conduit 15 is connected by the conduit 24 to the bulb 25 within which is a supply of mercury and which is surrounded by a coil 29 for the purpose of vaporizing the mercury. The bottom of bulb 25 is connected by conduit 31 to the discharge conduit 9 at a point below its connection to the roughing pump conduit 11.

The chamber 1 and the discharge conduit 9 are provided with water jackets 33 and 35 respectively. In the conduit 5 is a trap 37 surrounded by cooling jacket 39 preferably filled with liquid air.

The method of use of the above described apparatus is as follows: The vessel 6, which may be one of several attached to the conduit 5 to be simultaneously evacuated, is first partially exhausted by means of the roughing pump 13. When the pressure has been reduced as far as may efficiently be done in this manner, the mercury 27 in bulb 25 is vaporized by means of heating coil 39, thus causing a stream of mercury vapor to pass through the conduit 24 into the conduit 15. The greater portion of this mercury vapor discharges through the nozzle 23 and into the conduit 9; a portion, however, escapes through the throttling openings 21 into the surrounding passages formed by the conduits 17 and 19. The size and arrangement of the openings 21 are such that the pressure in the passage between the conduits 15 and 17 is less than that within the conduit 15, but greater than that within the passage between the conduits 17 and 19. There are thus formed three coaxial streams of mercury vapor, one within the other, and the proportions of the parts are such that the stream in the outermost passage is at so low a pressure that there is very little tendency for molecules of vapor to diverge therefrom into the surrounding space of the chamber 1, even if the gas therein is at the lowest pressure to which it is required to exhaust the vessel 6. The outermost stream of vapor moves at a sufficient velocity to entrain a considerable number of molecules of the surrounding gas, and the resulting mixture of gas and vapor is in turn drawn into the next inner vapor stream as it escapes from the end of the passage between the conduits 15 and 17, the pressure of this stream being higher than that of the outermost stream, but not so high as to permit an appreciable diffusion of vapor molecules into the outer stream. The intermixed streams of mercury vapor, together with the entrained gas molecules, are then drawn into the relatively high velocity jet issuing from the nozzle 23, the pressure and the velocity of the central stream being such that there is practically no tendency for these molecules to diffuse outwardly against the pressure of the surrounding stream of mixed vapor and gas. The velocity of the combined streams is sufficient to sweep the mixture of gas and vapor into the conduit 9 whence it is withdrawn through the conduit 11 by the roughing pump 13.

The water jacket 33 prevents the walls of the chamber 1 from being heated by the mercury vapor streams and thus aids in the condensation of such molecules as may escape from the outermost stream into the surrounding gas. The point of introduction of the gas into the mercury stream is likewise kept cool by the water jacket 33 and there is thus prevented the formation of a back flow of vapor molecules from the walls of the contracted portion of the chamber 1.

The water jacket 35 not only prevents the generation of a stream of mercury vapor in the conduit 9, but also condenses the mercury, which then flows into the conduit 31 and back to the bulb 27 where it is again vaporized. The few vapor molecules that may escape into the conduit 5 are either condensed on the walls cooled by the water jacket 33 or else precipitated in the trap 37.

It is to be understood that though the drawing shows means for providing three coaxial vapor streams, the number of conduits, and therefore the number of streams, may be reduced to two or increased in number as circumstances may require; likewise the size and position of the apertures 21 and the relative dimensions of the conduits and the other elements of the apparatus may be varied to suit the exigencies of each particular installation.

What is claimed is:

1. The method of exhausting gas containing vessels to low pressure which consists in entraining gas from the vessel to be exhausted into a stream of vapor and entraining the resulting mixture of gas and vapor into a second stream of vapor at a higher pressure than said first named stream.

2. Apparatus for exhausting gas containing vessels to low pressures, comprising means for creating a plurality of separate streams of vapor one within another, each of said streams in succession merging into the next inner stream, and means for leading the contents of the vessel to be exhausted into the outermost stream.

3. Apparatus for exhausting gas containing vessels to low pressures comprising means for creating a plurality of separate streams of vapor, one within the other and increasing in pressure from the outer stream to the inner stream, each of said streams in succession merging into the next inner stream, and means for leading the contents of the vessel to be exhausted into the outermost stream.

4. Apparatus for exhausting gas containing vessels to low pressures comprising a plurality of conduits one within another, the outer wall of each of said conduits extending at its discharge end beyond the corresponding wall of the next outer conduit, and means for connecting the discharge end of the outermost conduit with the vessel to be exhausted.

5. Apparatus for exhausting gas containing vessels to low pressures, comprising a plurality of conduits one with another, the outer wall of each of said conduits extending at its discharge end beyond the corresponding wall of the next outer conduit, each wall common to two adjacent conduits being provided with throttling openings, and means for supplying a stream of vapor to the innermost conduit.

6. Apparatus for exhausting gas containing vessels to low pressures comprising a chamber having an inlet for connection to the vessel to be exhausted and a discharge opening, and means for producing between said inlet and discharge opening a series of streams of vapor, the members of the series increasing in pressure with their distance from said inlet opening.

7. Apparatus for exhausting gas containing vessels to low pressures comprising a chamber adapted to be connected to the vessel to be exhausted and having a discharge opening, means for producing a stream of vapor and directing it through said chamber to said discharge opening, and means for producing and directing through said chamber to said discharge opening and in surrounding relation to said first stream a second stream of vapor at a lower pressure than said first stream.

In witness whereof I hereunto subscribe my name this 25th day of July, A. D. 1918.

OLIVER E. BUCKLEY.